(12) United States Patent
Wang et al.

(10) Patent No.: US 11,499,562 B1
(45) Date of Patent: Nov. 15, 2022

(54) TURBOCHARGER WASTE GATE POPPET VALVE CONNECTED TO ROTARY VALVE SHAFT BY ARM AND RETAINING RING

(71) Applicant: Garrett Transportation I Inc., Torrance, CA (US)

(72) Inventors: Huan Wang, Shanghai (CN); Yunbin Gong, Shanghai (CN); Xiaolei Jin, Shanghai (CN); Bin Zhu, Shanghai (CN)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/455,415

(22) Filed: Nov. 18, 2021

(51) Int. Cl.
  F04D 27/02 (2006.01)
  F16K 31/52 (2006.01)
  F04D 17/10 (2006.01)
  F02B 37/18 (2006.01)

(52) U.S. Cl.
  CPC .......... F04D 27/0215 (2013.01); F02B 37/18 (2013.01); F04D 17/10 (2013.01); F16K 31/521 (2013.01)

(58) Field of Classification Search
  CPC ...... F04D 27/0215; F04D 17/10; F02B 37/18; F02B 37/186; F16K 31/521; F16C 11/069
  USPC ....................................................... 415/144
  See application file for complete search history.

(56) References Cited

U.S. PATENT DOCUMENTS 11,352,945 B1 * 6/2022 Wang .................... F02B 37/186
2016/0348574 A1 * 12/2016 Goeckelmann ....... F02B 37/183

FOREIGN PATENT DOCUMENTS

| CN | 109707502 A | * | 5/2019 | ........... F01D 17/105 |
| CN | 112555194 A | * | 3/2021 | ............. F04D 29/42 |
| DE | 102018217240 A1 | * | 4/2020 | ........... F01D 17/105 |

* cited by examiner

Primary Examiner — J. Todd Newton
(74) Attorney, Agent, or Firm — John C. James

(57) ABSTRACT

A waste gate assembly for a turbocharger includes a valve member formed by a valve shaft and an arm attached to an end of the shaft, the arm defining a through bore, an inner surface of the through bore defining an arm groove therein. A poppet for the valve has a pin whose outer surface defines a pin groove. A generally polygonal retaining ring of elastically deformable wire is installed partially in the arm groove and partially in the pin groove to retain the poppet on the pin, thereby attaching the poppet to the arm of the valve member. An anti-rotation feature prevents relative rotation of the poppet about the pin axis. Vertices of the retaining ring are in the arm groove, while sides of the retaining ring are in the pin groove. Once the retaining ring is pre-installed in the arm groove of the arm, the arm can be assembled to the poppet by a push-to-connect process.

10 Claims, 10 Drawing Sheets

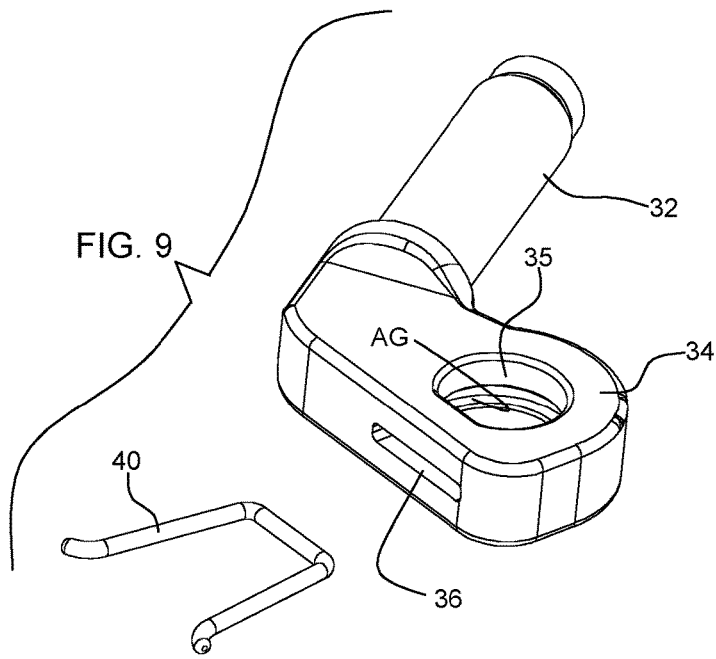
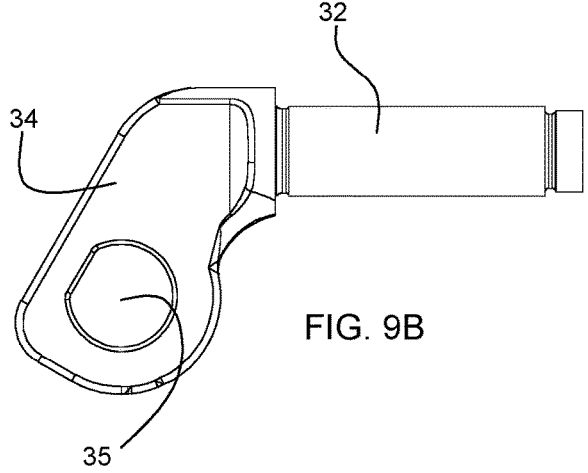
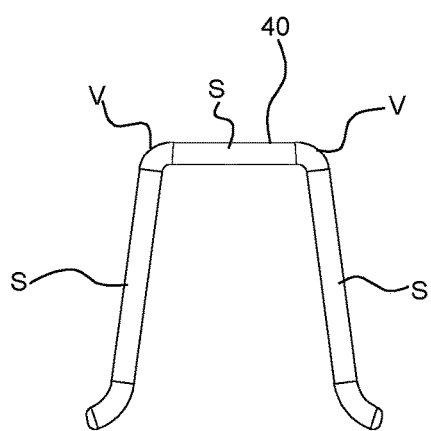
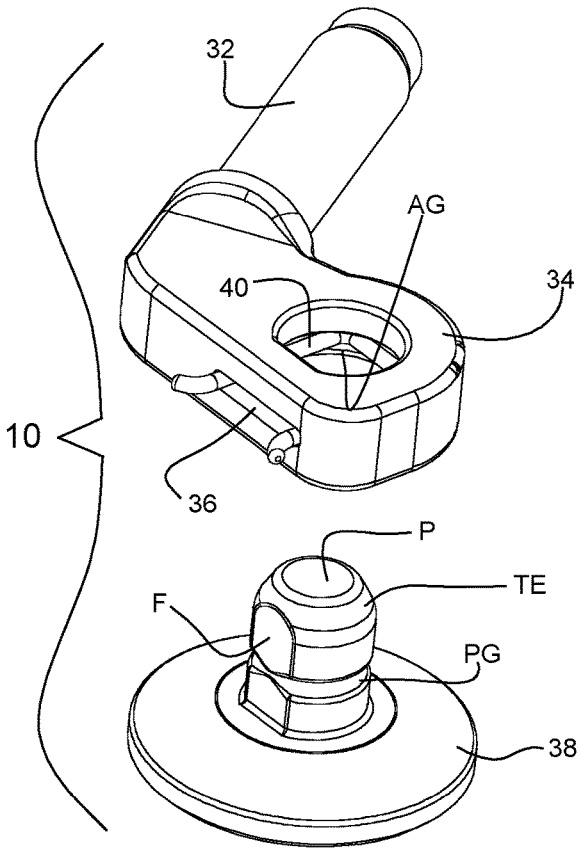

TURBOCHARGER WASTE GATE POPPET VALVE CONNECTED TO ROTARY VALVE SHAFT BY ARM AND RETAINING RING

BACKGROUND OF THE INVENTION

This application relates generally to turbochargers for internal combustion engines, and relates more particularly to a crank and linkage assembly for connecting between an actuator and an adjustable component such as a waste gate valve or the like.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas, which is then discharged into an exhaust conduit that may be connected to further treatment devices such as a catalytic device and/or sound-attenuating muffler. The turbine thus extracts power from the exhaust gas and drives the compressor. The compressor receives ambient air through an inlet of the compressor housing and the air is compressed by the compressor wheel and is then discharged from the housing to the engine air intake.

The turbine of the turbocharger typically includes a valve (often called a waste gate valve) arranged in the turbine housing in a location such that opening the valve causes the majority of exhaust gases coming from the engine to bypass the turbine wheel and proceed directly into the exhaust conduit. The waste gate valve enables the power-extraction of the turbine to be controlled, thereby controlling the amount of boost provided by the compressor. Thus, the waste gate valve can be either closed, partially opened to various degrees, or fully open, depending upon the operating condition of the engine and the amount of boost desired from the turbocharger.

The waste gate valve is typically actuated by a rotary actuator whose output shaft is connected to a crank. The actuator crank is rotatably coupled to one end of a linkage, and the opposite end of the linkage is rotatably coupled to a crank affixed to the valve shaft of the waste gate valve. An arm on the distal end of the valve shaft is connected to the poppet of the valve, typically by a pin projecting from the poppet and received through a bore in the arm. A disc washer is riveted to a distal end of the pin, with a spring washer disposed between the disc washer and the arm. There are drawbacks to this conventional linkage assembly, such as the difficulty of controlling the quality of the connection between the poppet and the arm.

SUMMARY OF THE DISCLOSURE

The present disclosure describes a waste gate assembly for a turbocharger that can mitigate or eliminate the drawbacks noted above, and achieve further advantages noted herein. In particular, the disclosed assembly can simplify the assembly process by facilitating a push-to-connect process between the valve member arm and the pin of the poppet.

In accordance with one embodiment disclosed herein, a waste gate assembly comprises:

a valve member comprising a poppet having a pin extending therefrom along a pin axis and terminating at a distal end of the pin, an outer surface of the pin defining a pin groove therein at least partially encircling the pin axis, the pin groove being spaced along the pin axis from the poppet;

a valve shaft extending along a shaft axis;

an arm affixed to one end of the valve shaft and extending therefrom at an oblique angle relative to the shaft axis and terminating at a distal end, the distal end defining a through bore adjacent the distal end, an inner surface of the through bore defining an arm groove therein, a lengthwise portion of the pin being disposed within the through bore of the arm such that the arm groove is aligned with the pin groove; and a retaining ring comprising an elastically deformable wire formed into a generally polygonal non-closed configuration such that the retaining ring defines a plurality of vertices and a plurality of sides and two ends, wherein each of said plurality of vertices is within the arm groove and at least two of the plurality of sides has a portion engaged in the pin groove, thereby restraining movement of the arm along the pin axis, and further comprising an anti-rotation feature preventing rotational movement of the poppet relative to the arm about the pin axis, whereby rotation of the valve shaft about the shaft axis causes the arm to move the poppet along an arc about the valve axis.

The retaining ring not only effects a connection between the arm and the poppet in a simple and repeatable fashion, but the retaining ring also provides a biasing force on the poppet (i.e., a pre-load force) urging the poppet away from the arm and toward the valve seat when the valve is closed. Additionally, the retaining ring allows a small amount of movement of the poppet relative to the arm in the direction of the through-bore's axis. These characteristics allow the poppet to form a secure seal against the valve seat.

The anti-rotation feature in one embodiment is formed by shape-locking between the pin having a non-round cross-sectional shape and the through bore in the arm having a corresponding non-round cross-sectional shape.

In another embodiment, the anti-rotation feature comprises a recess defined in the arm and a projection or key formed on the poppet, the key being received into the recess to prevent rotation of the poppet.

In some embodiments, the two ends of the retaining ring extend into the recess defined in the arm.

In other embodiments, the arm defines a slot extending from an outer surface of the arm to the through bore, and the two ends of the retaining ring extend through the slot.

BRIEF DESCRIPTION OF THE DRAWINGS

Having described the present disclosure in general terms, reference will now be made to the accompanying drawing(s), which are not necessarily drawn to scale, and wherein:

FIG. 9 is an exploded view of the rotary valve member and retaining ring, minus the poppet;

FIG. 9A is a plan view of the retaining ring;

FIG. 9B is a plan view of the rotary valve shaft and arm;

FIG. 10 is an exploded view showing the rotary valve member with the retaining ring pre-installed therein, ready to be pushed onto the pin of the poppet;

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
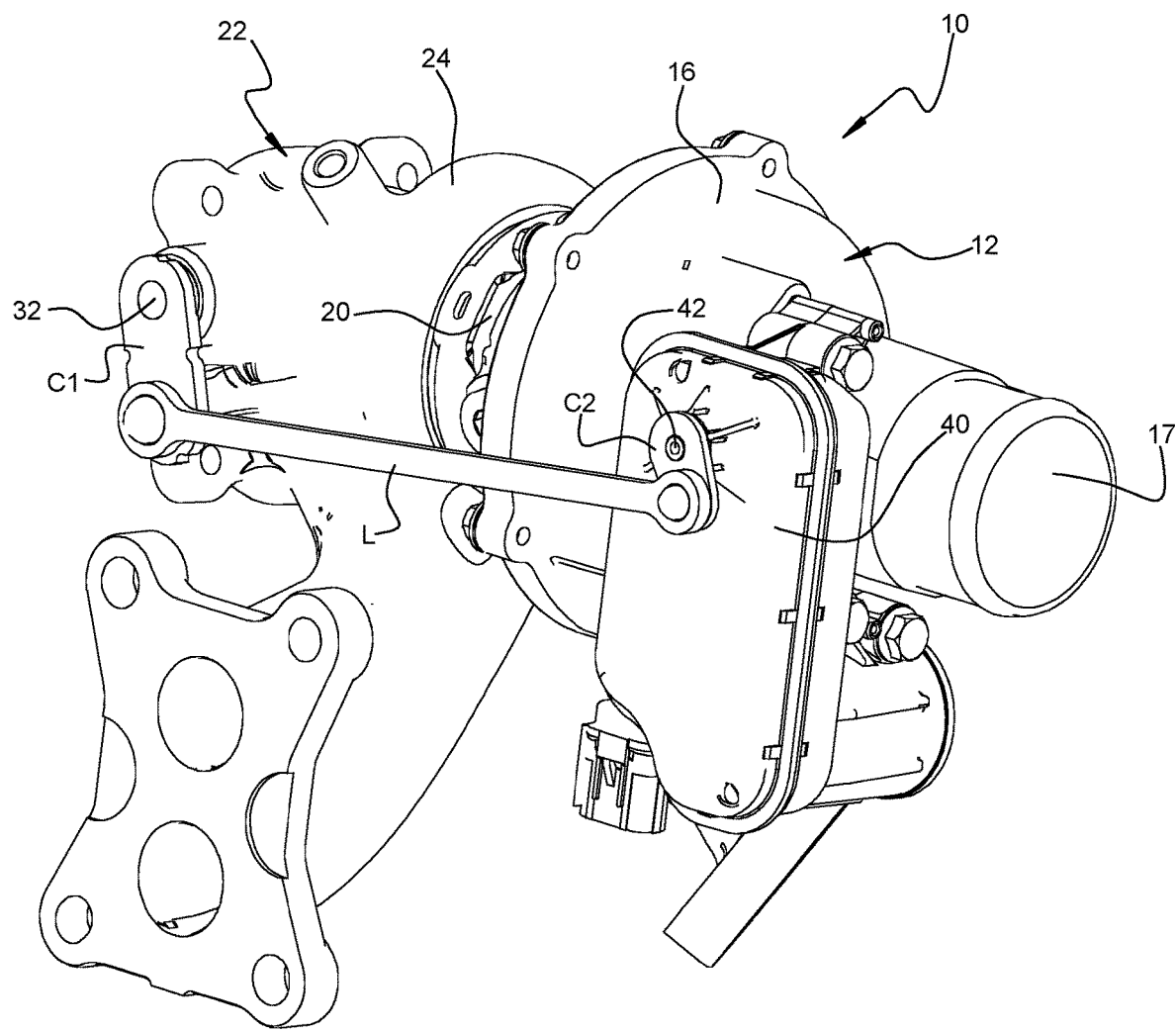
FIG. 1 is an isometric view of a turbocharger in accordance with an embodiment of the invention.

FIG. 1 illustrates a turbocharger 10 in accordance with an embodiment of the invention. The turbocharger comprises a compressor 12 having a compressor wheel (not visible) mounted within a compressor housing 16 defining an air inlet 17 for the compressor, and a turbine 22 comprising a turbine wheel 25 (FIG. 3) mounted within a turbine housing 24 and connected to a shaft (not visible) that also connects with the compressor wheel. A center housing 20 is disposed between and secured to the compressor housing and turbine housing, and contains bearings for the shaft.

Figure 2:
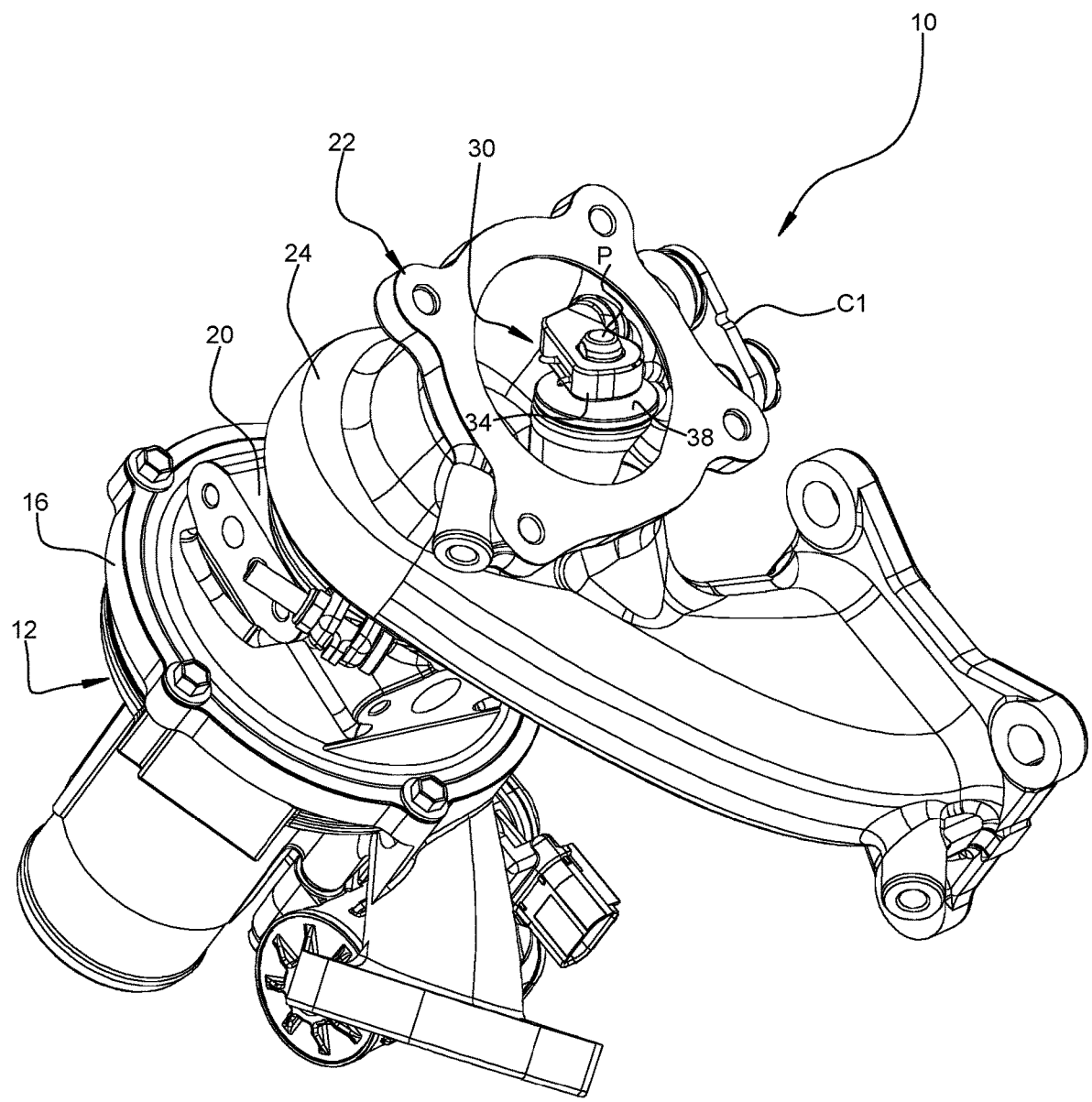
FIG. 2 is a further isometric view of the turbocharger, looking generally into the bore in the turbine housing.

The turbine housing 24 defines an annular chamber surrounding the turbine wheel 25 for receiving exhaust gas from an internal combustion engine (not shown). Exhaust gas is directed from the chamber via a turbine nozzle onto the turbine wheel. In some operating conditions, it is desirable to cause some of the exhaust gas to bypass the turbine wheel and proceed directly into the downstream exhaust conduit, and to this end, turbochargers typically include a waste gate valve 30 (FIGS. 2-4) arranged for opening and closing a bypass passage 29 (FIG. 3) defined by the turbine housing. The bypass passage connects between the exhaust gas chamber and the discharge bore of the turbine housing downstream of the turbine wheel. Thus, when the waste gate valve is opened, some of the exhaust gas passes through the valve and thereby bypasses the turbine wheel.

With reference to FIG. 1, regulation of the waste gate valve is accomplished by an actuator 40 connected to the valve via a kinematic linkage arrangement comprising a first crank C1, a linkage L, and a second crank C2. The valve 30 has a rotary valve shaft 32, and one end of the first crank C1 is rigidly affixed to the valve shaft. The actuator 40 has a rotary output shaft 42, and one end of the second crank C2 is rigidly affixed to the output shaft. A first end of the linkage L is rotatably coupled to the first crank C1, and the opposite second end of the linkage is rotatably coupled to the second crank C2. Accordingly, rotation of the actuator shaft 42 causes two cranks and the linkage to impart rotation to the valve shaft 32.

Figure 3:
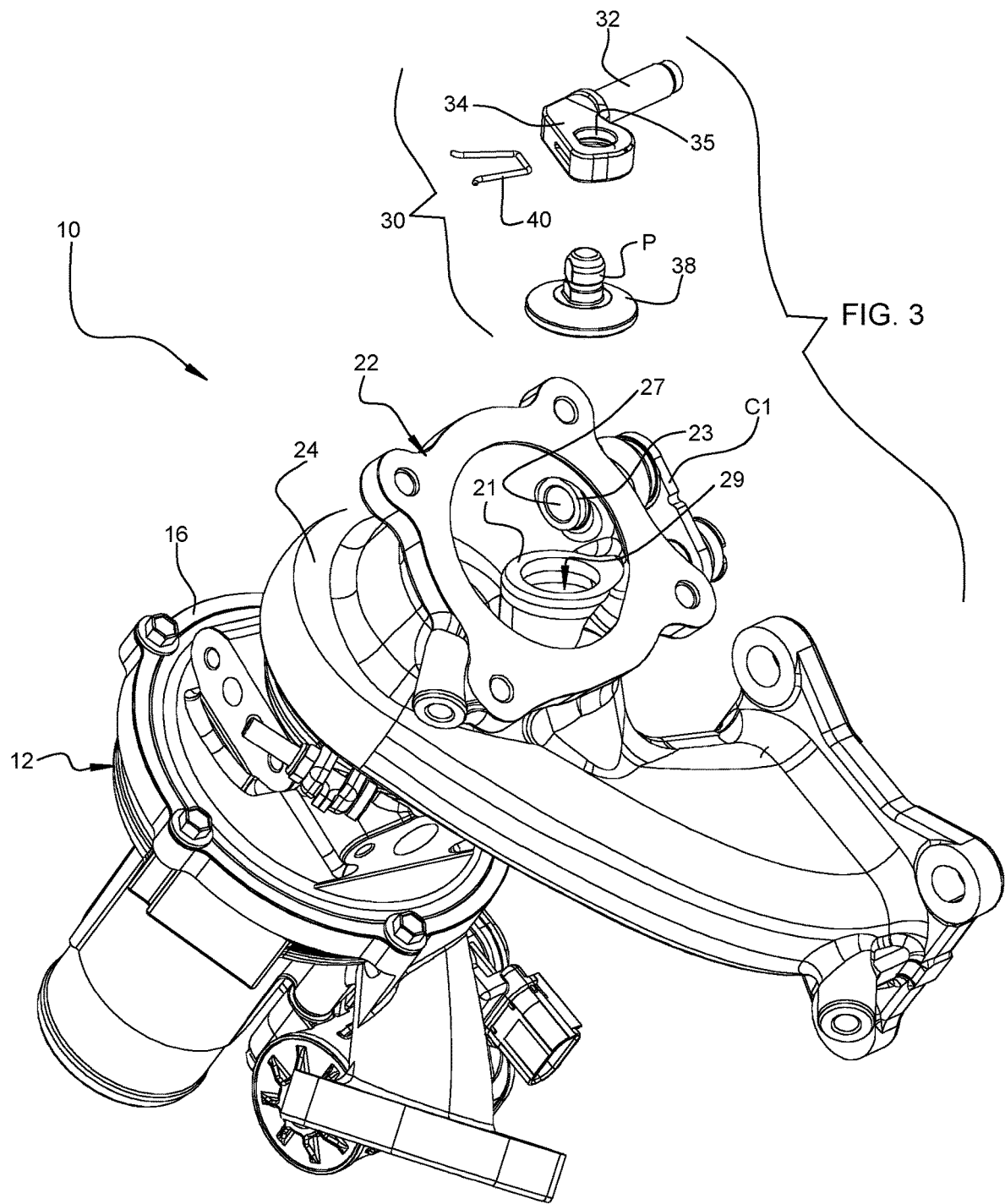
FIG. 3 is an exploded view of the turbocharger of FIG. 2, showing the poppet, rotary valve member, and retaining ring of the waste gate valve exploded away from the turbine housing.
Figure 4:
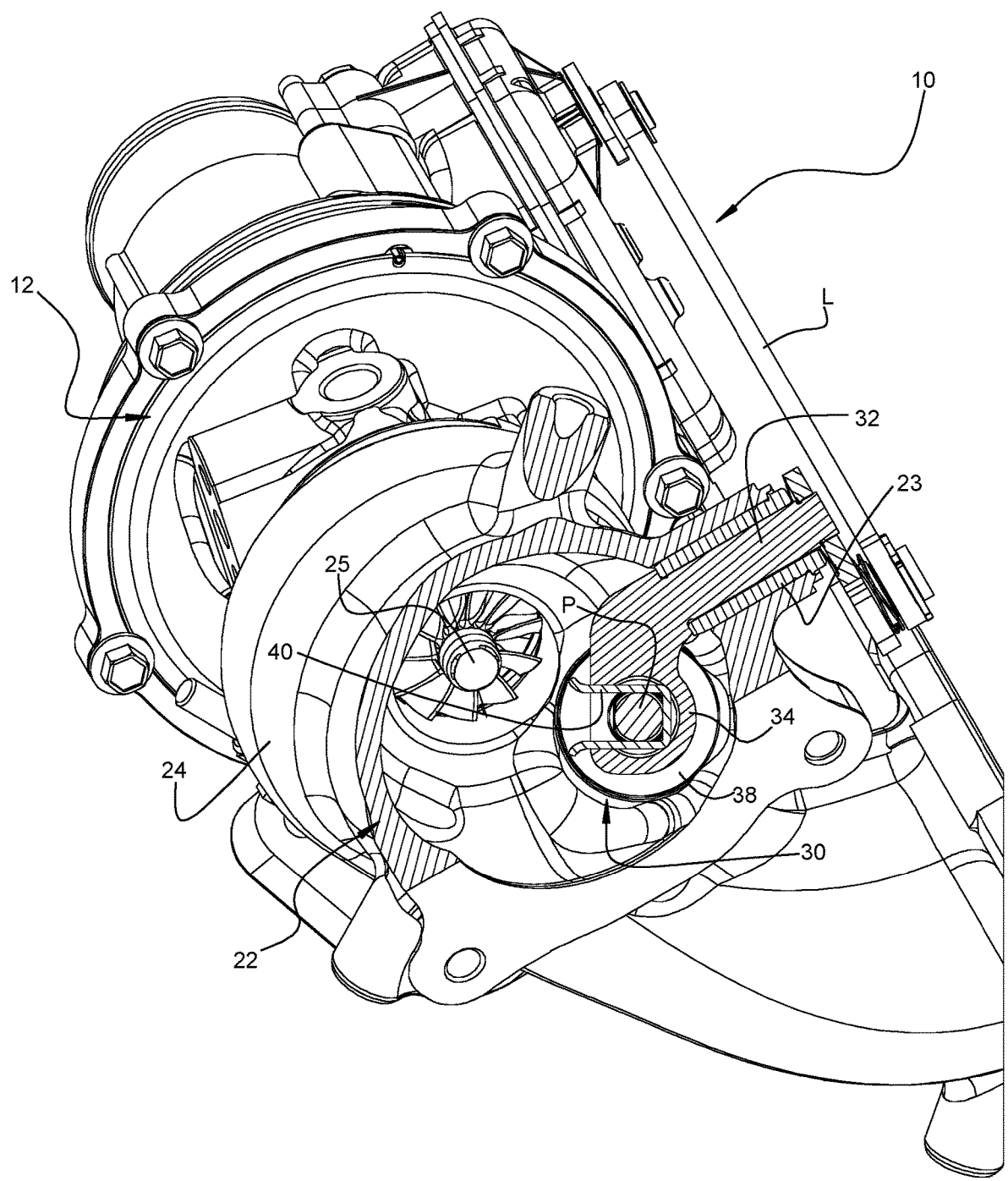
FIG. 4 is a cross-sectional view through the turbocharger of FIG. 2 along a plane that is perpendicular to the pin of the valve poppet.
Figure 5:
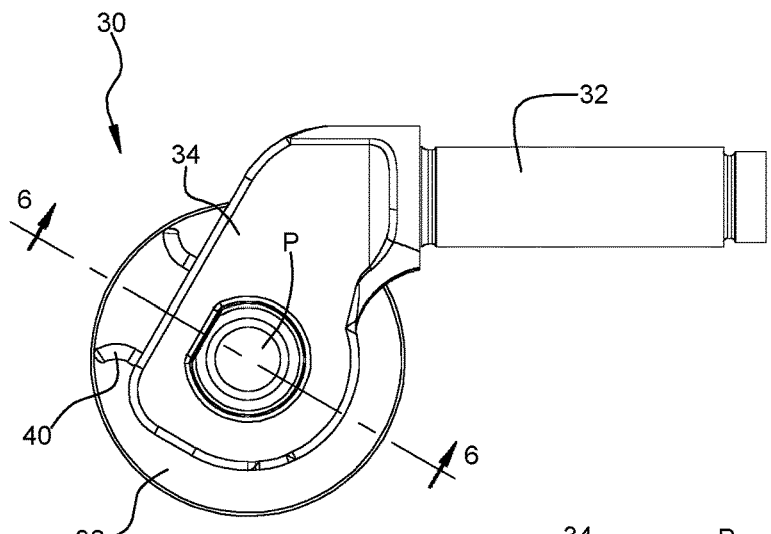
FIG. 5 is a plan view of the rotary valve member.
Figure 6:
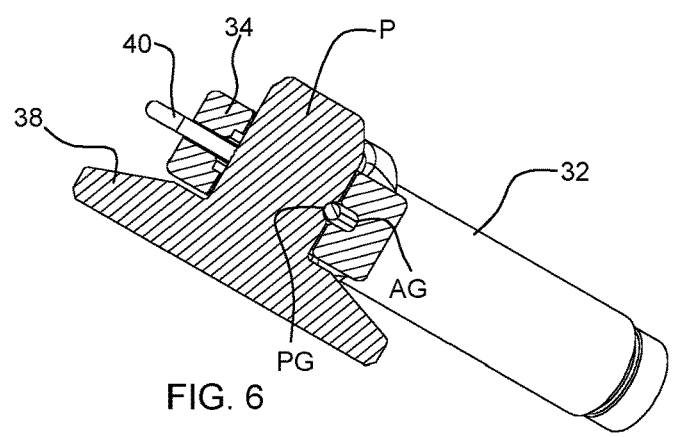
FIG. 6 is a cross-sectional view through the valve member along line 6-6 in FIG. 5.

As best seen in FIGS. 3 and 4, the turbine housing defines a bearing hole 27 in which a bushing 23 is installed, and the valve shaft 32 of the waste gate valve extends through the bushing, which allows the shaft to rotate about its axis and thereby cause the valve to open or close the bypass passage 29. To this end, the turbine housing defines valve seat 21 the surrounds the open end of the bypass passage. The waste gate valve includes a poppet 38 having a disc shape and being sized and configured to abut the valve seat 21 so that the poppet closes the bypass passage. The poppet includes an integral pin P projecting from the center of the poppet normal to the plane of the disc. The pin is received into a through bore 35 formed at a distal end of an arm 34 that is affixed to the end of the valve shaft 32, the arm extending at an oblique angle to the valve shaft axis. The connection of the pin to the arm is accomplished by a retaining ring 40 in a manner described below.

The retaining ring 40 is formed from elastically deformable wire by any suitable process such as a rolling process as commonly used for rolling springs and the like, so that the retaining ring has a generally polygonal shape that is non-closed, i.e., a gap remains between the opposite ends of the wire. As shown in FIG. 9A, the ring is formed to have a plurality of vertices V and a plurality of sides S each of which extends between two of said vertices. In the embodiment of FIG. 9A, the retaining ring is generally U-shaped, having two vertices V and three sides S. The terms "vertex" and "vertices" do not require or imply that they must be sharp corners, which in practice would be impossible, it always being necessary to have a non-zero radius of curvature of the wire at each vertex. Also, the term "side" does not require or imply that the sides must be linear, although linear sides can be used as shown in the drawings.

As noted, the arm 34 defines a through bore 35. The inner surface of the bore defines an arm groove AG at least partially encircling the central axis of the bore. The radial depth and the axial length of the arm groove are sized in relation to the diameter of the wire so that portions of the wire can be received into the arm groove.

Figure 8:
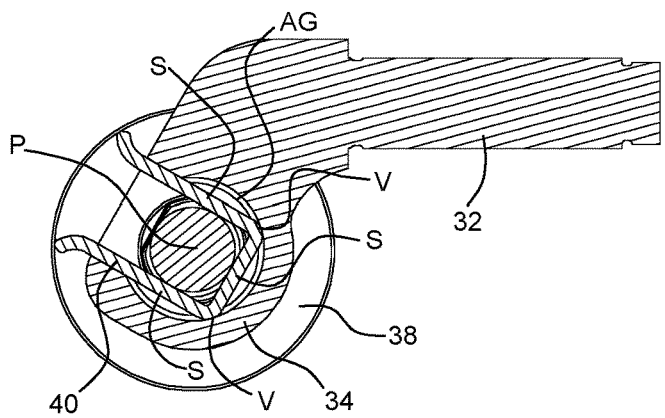
FIG. 8 is a cross-sectional view along line 8-8 in FIG. 7.
Figure 7:
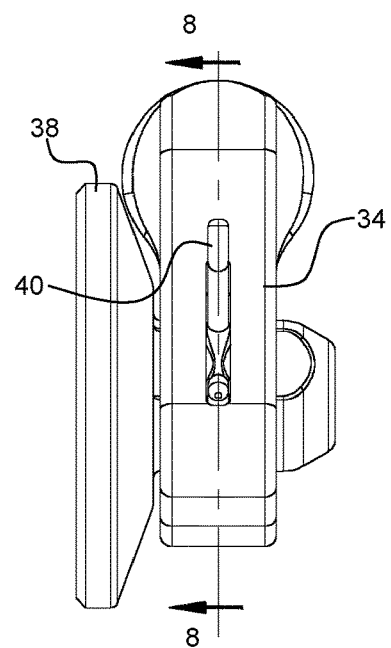
FIG. 7 is a side view of the rotary valve member.

Providing the retaining ring with vertices and sides enables the vertices V of the ring to be engaged in the arm groove AG while the sides S remain radially inward of the radially outer wall of the arm groove, as best seen in FIG. 8. Advantageously, the retaining ring 40 is pre-installed in the arm 34 as shown in FIG. 10, prior to connection to the pin of the poppet. To facilitate the installation of the retaining ring into the arm, the arm includes a slot 36 that extends from an outer face of the arm into the through bore 35. The retaining ring is pushed through this slot until the vertices of the retaining ring are seated into the arm groove. The two ends of the retaining ring wire are flared away from each other with a spacing that exceeds the width of the slot 36. When the retaining ring is fully installed into the arm, the two ends of the wire project out from the slot and are compressed toward each other by the side walls of the slot (compare FIGS. 8 and 9A).

With respect to FIG. 9B, the through bore 35 in the arm 34 of the valve member is non-round. In the illustrated embodiment, the shape of the bore comprises a circle with a flat on one side. As shown in FIG. 10, the pin P on the poppet 38 correspondingly has a non-round cross-sectional shape consisting of a circle with a flat F on one side, complementing the non-round bore 35 in the arm. Accordingly, shape-locking occurs between these complementary shapes such that the poppet is prevented from rotating about the pin axis relative to the arm, thus comprising a non-rotation feature for the valve arrangement.

Figure 11:
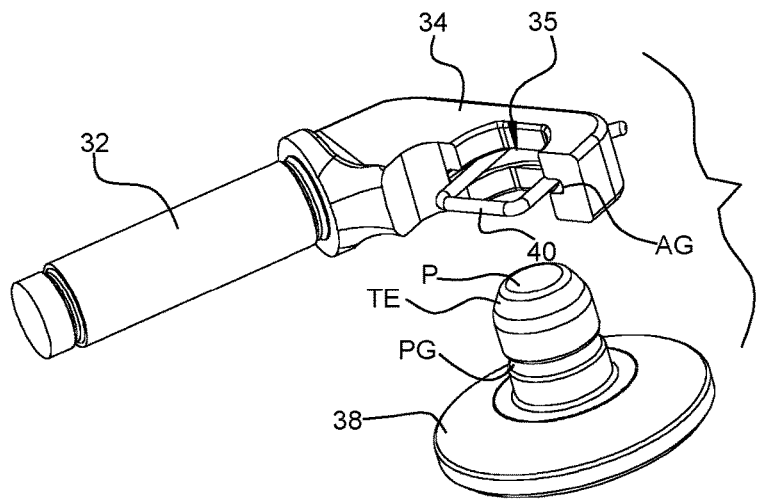
FIG. 11 is similar to FIG. 10, but a portion of the arm has been removed to enable the retaining ring to be seen pre-installed in the arm groove.
Figure 12:
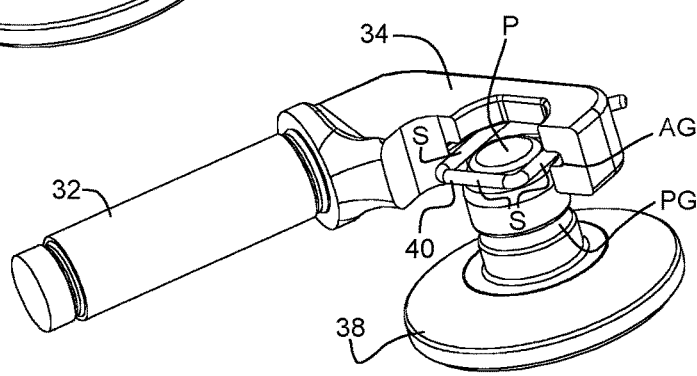
FIG. 12 illustrates initiation of a push-to-connect process to connect the arm to the poppet, wherein the tapered end of the pin begins to expand the retaining ring radially outwardly.
Figure 13:
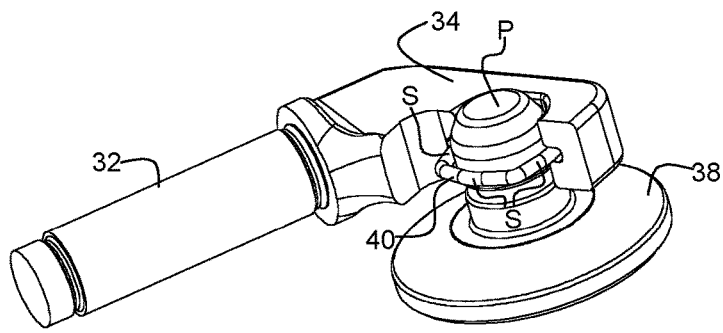
FIG. 13 illustrates a later time in the push-to-connect process as the arm is pushed further onto the pin to further expand the retaining ring.

With respect to now to FIGS. 11-14, a push-to-connect process for connecting the poppet to the arm of the valve member is described. In these figures, a portion of the arm 34 has been removed so that the retaining ring 40 can be seen. FIG. 11 shows the unconnected assembly prior to the push-to-connect process. The pin P of the poppet 38 extends along a pin axis and terminates at a distal end. The generally cylindrical outer surface of the pin defines a pin groove PG therein. The radial depth and axial length of the pin groove are selected in relation to the diameter of the wire forming the retaining ring 40. Distal of the pin groove, the pin defines a tapered end TE. Connection of the arm 34 having the pre-installed retaining ring 40 to the pin of the poppet is a simple push-to-connect process in which the tapered end of the pin contacts and urges the retaining ring to radially expand. More particularly, it is the sides S of the ring that are resiliently deformed radially outwardly (see FIGS. 12 and 13).

Figure 14:
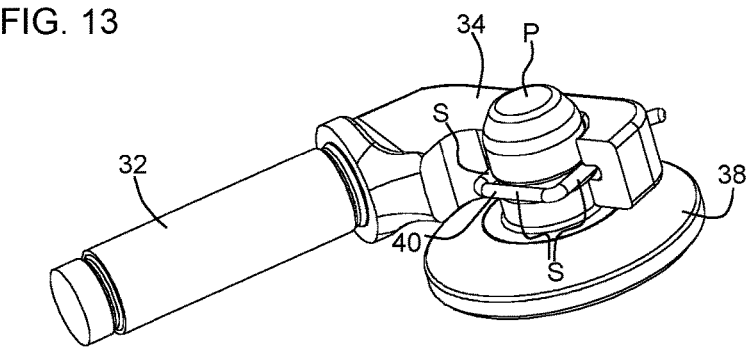
FIG. 14 illustrates a still later time in the push-to-connect process when the arm groove has become aligned with the pin groove and the retaining ring has contracted radially inwardly so that portions of its sides are within the pin groove, thereby captively connecting the poppet to the arm.

Pushing the arm further onto the pin then will cause the arm groove AG to become aligned with the pin groove PG as best seen in FIG. 14. Once these grooves become aligned, the retaining ring 40 resiliently returns toward its relaxed state, under the restoring force of the wire, and as a result, the sides S of the ring become engaged in the pin groove PG of the pin. At the same time, the vertices V of the retaining ring are engaged in the arm groove AG as depicted in FIG. 8. The retaining ring thus captively retains the arm in connection with the pin to restrain axial movement of the arm along the pin axis. As previously noted, the arm is prevented from rotating relative to the pin by the shape-locking between the pin and the arm bore. The retaining ring allows a small amount of movement of the poppet 38 relative to the arm 34 along the axial direction of the through-bore 35. Furthermore, when the retaining ring has a non-planar free shape (as in the embodiments of FIGS. 21 and 22, for example), it also exerts a biasing force on the poppet tending to urge the poppet against the valve seat when the valve is closed.

Figure 15:
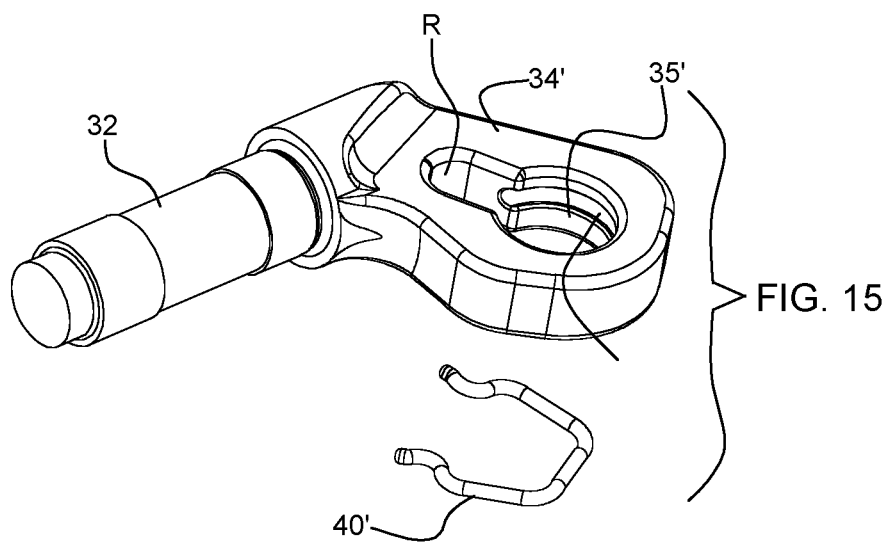
FIG. 15 is an exploded view showing an alternative embodiment of rotary valve member and retaining ring.
Figure 15A:
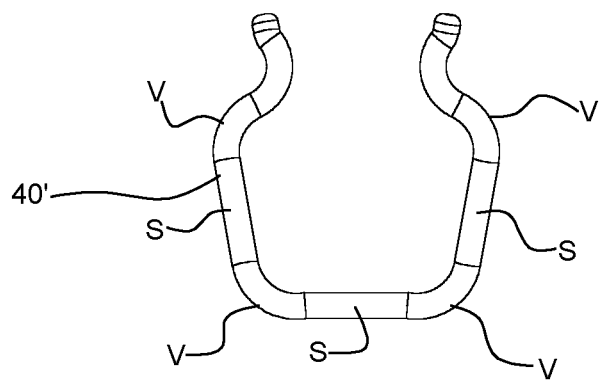
FIG. 15A is a plan view of the retaining ring for the alternative embodiment.
Figure 16:
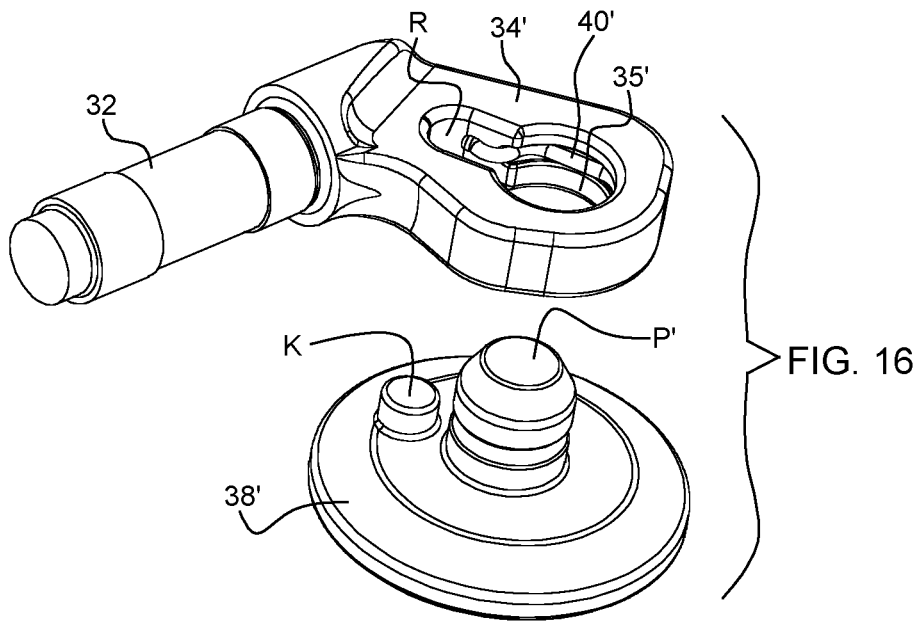
FIG. 16 is an exploded view of the rotary valve member with retaining ring pre-installed in its through bore, and the poppet ready for connection to the arm of the valve member.
Figure 17:
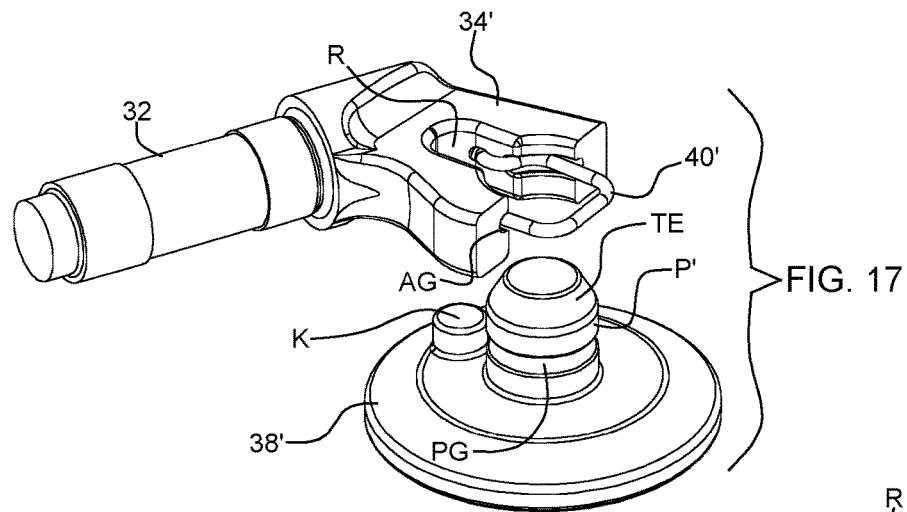
FIG. 17 is an exploded view showing the rotary valve member of the alternative embodiment with the retaining ring pre-installed therein, a portion of the arm having been removed to enable the retaining ring to be seen pre-installed in the arm groove, ready to be pushed onto the pin of the poppet.
Figure 18:
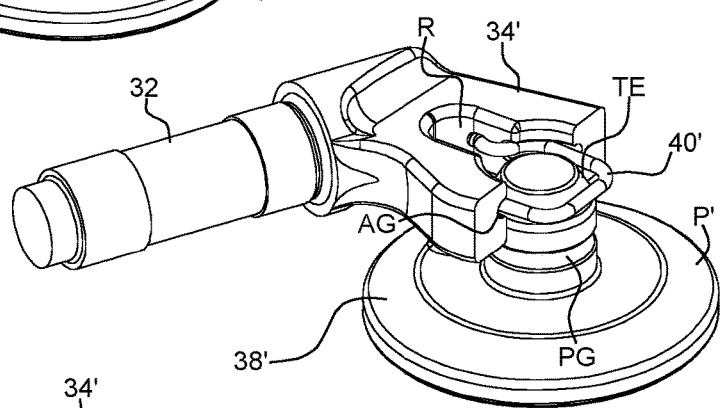
FIG. 18 illustrates initiation of a push-to-connect process to connect the arm to the poppet, wherein the tapered end of the pin begins to expand the retaining ring radially outwardly.
Figure 19:
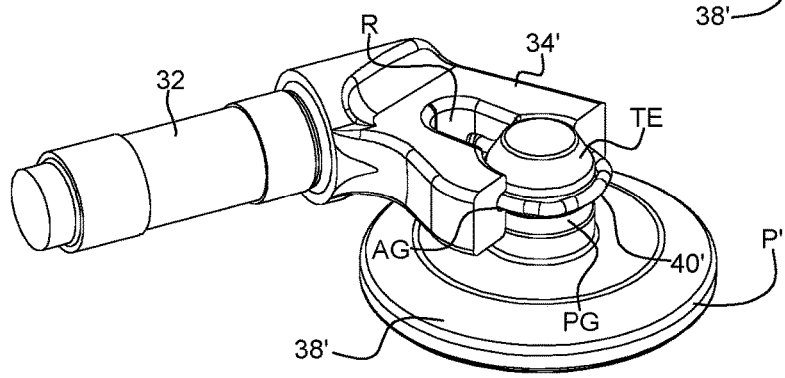
FIG. 19 illustrates a later time in the push-to-connect process as the arm is pushed further onto the pin to further expand the retaining ring.
Figure 20:
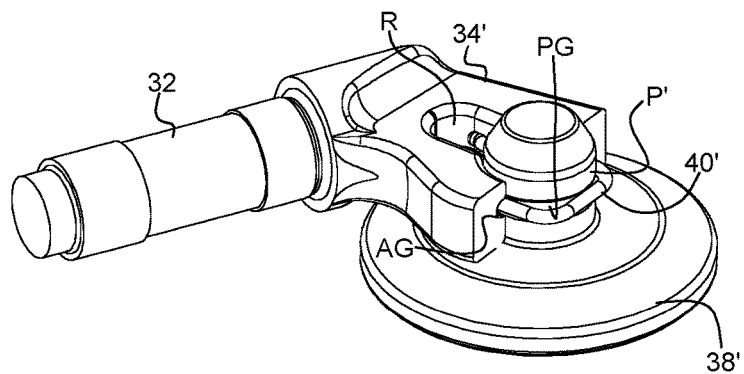
FIG. 20 illustrates a still later time in the push-to-connect process when the arm groove has become aligned with the pin groove and the retaining ring has contracted radially inwardly so that portions of its sides are within the pin groove, thereby captively connecting the poppet to the arm.

FIGS. 15-20 illustrate a second embodiment of the invention in which the retaining ring 40' has a different configuration and the anti-rotation feature also differs from that of the first embodiment. As seen in FIG. 15, the modified arm 34' has a through bore 35' that is generally circular but connects with a further recess R in the arm to form a keyhole shape. The poppet 38' includes a key K comprising a short post or projection on one side of and extending parallel to the pin P'. When the poppet is connected to the arm 34', the key fits into the bottom side of the recess R and thereby prevents the poppet from rotating about the pin. The retaining ring 40' (FIG. 15A) is generally Omega-shaped, having four vertices V and three sides S. FIG. 16 shows the retaining ring pre-installed in the arm groove AG of the arm 34' (and in that state is relaxed or only slightly compressed radially inwardly by the outer wall of the groove). The two ends of the wire extend into the recess R. The retaining ring 40' functions substantially like the retaining ring 40 of the first embodiment. The tapered end TE of the pin expands the sides of the retaining ring radially outwardly as the arm is pushed onto the pin (FIGS. 18 and 19), and once the arm groove AG becomes aligned with the pin groove PG, the sides return toward their original configuration and the ring's vertices V are engaged in the arm groove while the sides S are engaged in the pin groove (FIG. 20).

Figure 21A:
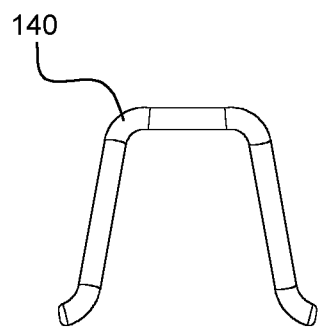
FIGS. 21A through 21C are top, side, and isometric views, respectively, of a retaining ring in accordance with one embodiment of the invention.
Figure 21B:
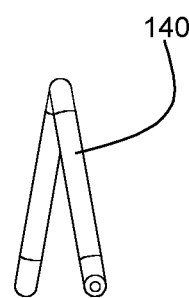
Figure 21C:
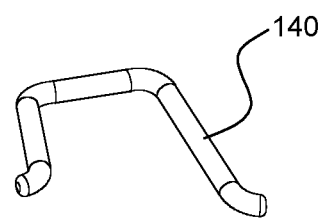
Figure 22A:
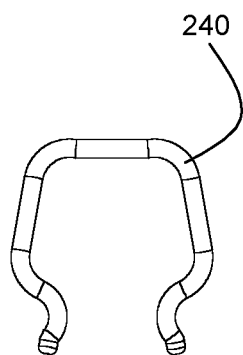
FIGS. 22A through 22C are top, side, and isometric views, respectively, of a retaining ring in accordance with a further embodiment of the invention.
Figure 22B:
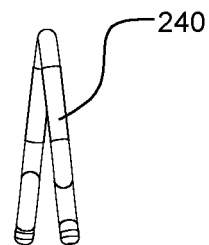
Figure 22C:
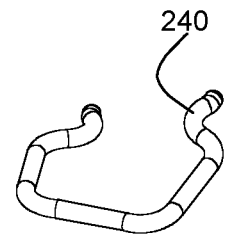

The invention is not limited to any particular configuration of retaining ring. The embodiments described above include planar retaining rings, but the invention is not limited to planar rings. FIGS. 21A through 21C depict an alternative embodiment of retaining ring 140 that is generally U-shaped and non-planar. FIGS. 22A through 22C illustrate yet another embodiment of retaining ring 240 that is generally Omega-shaped and non-planar. Other configurations (rectangular, triangular, pentagonal, etc.) may also be used. While the illustrated retaining rings have the two ends of the wire flared outwardly away from each other, it is also possible for the two ends to extend toward each other, or to be parallel to each other.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A waste gate assembly for a turbocharger, comprising:
  a valve member comprising a poppet having a pin extending therefrom along a pin axis and terminating at a distal end of the pin, an outer surface of the pin defining a pin groove therein at least partially encircling the pin axis, the pin groove being spaced along the pin axis from the poppet;

a valve shaft extending along a shaft axis;

an arm affixed to one end of the valve shaft and extending therefrom at an oblique angle relative to the shaft axis and terminating at a distal end, the distal end defining a through bore adjacent the distal end, an inner surface of the through bore defining an arm groove therein, a lengthwise portion of the pin being disposed within the through bore of the arm such that the arm groove is aligned with the pin groove; and a retaining ring comprising an elastically deformable wire formed into a polygonal non-closed configuration such that the retaining ring defines a plurality of vertices and a plurality of sides and two ends, wherein each of said plurality of vertices is within the arm groove and at least two of the plurality of sides has a portion engaged in the pin groove, thereby restraining movement of the arm along the pin axis, and further comprising an anti-rotation feature preventing rotational movement of the poppet relative to the arm about the pin axis, whereby rotation of the valve shaft about the shaft axis causes the arm to move the poppet along an arc about the valve axis.

2. The waste gate assembly of claim 1, wherein the anti-rotation feature is formed by shape locking between the pin having a non-round cross-sectional shape and the through bore in the arm having a corresponding non-round cross-sectional shape.

3. The waste gate assembly of claim 1, wherein the anti-rotation feature comprises a recess defined in the arm and a projection formed on the poppet, the projection being received into the recess to prevent rotation of the poppet.

4. The waste gate assembly of claim 3, wherein the two ends of the retaining ring extend into the recess defined in the arm.

5. The waste gate assembly of claim 1, wherein the arm defines a slot extending from an outer surface of the arm to the through bore, and the two ends of the retaining ring extend through the slot.

6. A turbocharger comprising a compressor and a turbine, the turbine comprising a turbine housing and a turbine wheel mounted therein, the turbine housing defining a bypass passage for exhaust gases to bypass the turbine wheel, and a valve seat surrounding an open end of the bypass passage, the turbocharger further comprising a waste gate assembly comprising:

a valve member comprising a poppet having a pin extending therefrom along a pin axis and terminating at a distal end of the pin, an outer surface of the pin defining a pin groove therein at least partially encircling the pin axis, the pin groove being spaced along the pin axis from the poppet;

a valve shaft extending along a shaft axis;

an arm affixed to one end of the valve shaft and extending therefrom at an oblique angle relative to the shaft axis and terminating at a distal end, the distal end defining a through bore adjacent the distal end, an inner surface of the through bore defining an arm groove therein, a lengthwise portion of the pin being disposed within the through bore of the arm such that the arm groove is aligned with the pin groove; and a retaining ring comprising an elastically deformable wire formed into a polygonal non-closed configuration such that the retaining ring defines a plurality of vertices and a plurality of sides and two ends, wherein each of said plurality of vertices is within the arm groove and at least two of the plurality of sides has a portion engaged in the pin groove, thereby restraining movement of the arm along the pin axis, and further comprising an anti-rotation feature preventing rotational movement of the poppet relative to the arm about the pin axis, wherein the valve shaft extends through a bearing hole defined in the turbine housing, rotation of the valve shaft about the shaft axis causing the arm to move the poppet along an arc about the valve axis so as to either place the poppet in engagement with the valve seat to close the bypass passage or displace the poppet away from the valve seat to open the bypass passage.

7. The turbocharger of claim 6, wherein the anti-rotation feature is formed by shape locking between the pin having a non-round cross-sectional shape and the through bore in the arm having a corresponding non-round cross-sectional shape.

8. The turbocharger of claim 6, wherein the anti-rotation feature comprises a recess defined in the arm and a projection formed on the poppet, the projection being received into the recess to prevent rotation of the poppet.

9. The turbocharger of claim 8, wherein the two ends of the retaining ring extend into the recess defined in the arm.

10. The turbocharger of claim 6, wherein the arm defines a slot extending from an outer surface of the arm to the through bore, and the two ends of the retaining ring extend through the slot.

* * * * *